(12) United States Patent
Parrinello (10) Patent No.: US 8,640,898 B2
(45) Date of Patent: Feb. 4, 2014

(54) CLOSURE CAP COMPRISING A SEAL GASKET

(75) Inventor: Fiorenzo Parrinello, Medicina (IT)

(73) Assignee: Sacmi-Cooperativa Meccanici Imola-Soc. Coop A.R.L., Imola (Bologna) (IT)

( * ) Notice: Subject to any disclaimer, the term of this patent is extended or adjusted under 35 U.S.C. 154(b) by 682 days.

(21) Appl. No.: 11/951,932

(22) Filed: Dec. 6, 2007

(65) Prior Publication Data

US 2008/0105685 A1 May 8, 2008

Related U.S. Application Data

(62) Division of application No. 10/466,212, filed as application No. PCT/IB02/00093 on Jan. 14, 2002, now Pat. No. 7,314,589.

(30) Foreign Application Priority Data

Jan. 18, 2001 (IT) .............................. RE2001A0001

(51) Int. Cl.
*B65D 53/00* (2006.01)
(52) U.S. Cl.
USPC .................... 215/341; 215/DIG. 2; 248/66.4; 264/268
(58) Field of Classification Search
USPC ....... 215/341, DIG. 2, DIG. 4, 329, 343, 344, 215/347, 349, DIG. 1; 428/36.7, 66.3, 66.4; 264/268, 255, 271.1, 250
See application file for complete search history.

(56) References Cited

U.S. PATENT DOCUMENTS

| | | | |
|---|---|---|---|
| 3,637,103 A | 1/1972 | Ptak | |
| 4,314,799 A | 2/1982 | Amberg et al. | |
| 4,723,678 A | 2/1988 | Kollen et al. | |
| 5,143,763 A * | 9/1992 | Yamada et al. | 428/36.2 |
| 5,186,991 A * | 2/1993 | Samuel et al. | 428/35.8 |
| 5,356,021 A * | 10/1994 | McBride et al. | 215/349 |
| 5,762,219 A * | 6/1998 | Parrinello | 215/351 |
| 6,306,330 B1 | 10/2001 | Cerny | |
| 6,399,170 B1 * | 6/2002 | Hock et al. | 428/36.6 |
| 6,656,406 B2 | 12/2003 | Parrinello | |
| 6,660,349 B1 | 12/2003 | Bourgeois | |
| 7,021,478 B1 | 4/2006 | Hock | |
| 7,182,986 B1 * | 2/2007 | Haneda et al. | 428/36.6 |

FOREIGN PATENT DOCUMENTS

| | | |
|---|---|---|
| EP | 0 920 967 | 6/1999 |
| EP | 0 926 078 | 6/1999 |
| EP | 1 081 058 | 3/2001 |

* cited by examiner

*Primary Examiner* — J. Gregory Pickett
*Assistant Examiner* — Raven Collins
(74) *Attorney, Agent, or Firm* — Browdy and Neimark, PLLC (57) ABSTRACT

A cap for a container provided with an internal seal gasket that combines a first layer in contact with the cap, which first layer provides a narrower against gases such as oxygen and carbon dioxide. A second layer in contact with the first layer, which second layer possesses mechanical sealing properties.

20 Claims, 12 Drawing Sheets

CLOSURE CAP COMPRISING A SEAL GASKET

TECHNICAL FIELD

This invention concerns those stopper caps formed by moulding synthetic materials, such as the stopper caps for example screwed onto drink or food bottles.

In particular the invention relates to stopper caps formed by hot compression moulding, however the method can also be applied to stoppers formed by injection moulding or by other methods.

BACKGROUND ART

Caps can generally be of one-piece type in which the cap material itself forms the seal, by virtue of the shape of the cap, when this latter is screwed onto the container neck; or be of two-piece type in which the central panel of the cap is bounded by a restraining ring containing a gasket of soft material which forms the seal when compressed by being screwed against the container mouth.

However, the development of cap forming methods using hot compression, together with the increasing number of materials used, have highlighted the need to provide the cap with independent sealing means, to be applied during the formation of the cap itself.

The nature of the container contents has also highlighted the need to form not only a mechanical seal tight against liquids, but also a seal effective against gases.

For example, certain types of liquid foods must necessarily be protected against oxidation by preventing undesirable oxygen entry into the container after the cap has been screwed down.

Oxygen can enter by permeation in the form of molecules, and is not prevented by the materials usually used to construct caps.

In the case of carbonated drinks it is also important to seek to limit $CO_2$ migration, which can occur both mechanically and by permeation.

It has been sought to provide a seal against gases, the so-called barrier effect, by constructing or installing a discoidal gasket able to provide the desired barrier effect. However this solution is not generally satisfactory because the materials used to provide the barrier effect do not possess mechanical characteristics suitable for forming a sufficient seal as their hardness exceeds that necessary to ensure a good mechanical seal against gases and liquids.

The object of the present patent is to provide closure caps, preferably formable by known compression moulding processes, and the relative forming method, which are able to provide an hermetic seal at the mouth of containers both against the contained liquid and against gases, and hence prevent the entry of oxygen and the exit of $CO_2$.

DISCLOSURE OF THE INVENTION

This object is attained by the method and by the cap defined in the claims.

The invention will be more apparent from the description of various embodiments of the compression moulding process which enables the invention to be implemented. In the ensuing description the cap is formed by a compression process, but could also be formed in other ways, for example by injection moulding.

The compression process consists of feeding, into the cavity of a suitably temperature-controlled mould, a quantity of synthetic material, such as polypropylene homopolymer or polypropylene copolymers in the plastic state.

A die, known as the cap-forming die, is then inserted to force the material into the interspace created between the die and the cavity, until this interspace is filled. The shapes of the cavity and die are mutually complementary, and create respectively the outer and inner shape of the cap.

The process of this patent starts from the cap formed in this manner.

A first portion of a material able to provide a barrier action against gases such as $O_2$ and $CO_2$, and other gases of organic origin, is inserted into the cap.

This gas-impermeable material is a material preferably chosen from PVDC (polyvinyl dichloride), resins of high nitrile content, PA (polyamide), EVOH (polyvinyl alcohol) and PEN (polyethylene naphthenate).

It is a compression-mouldable material, and is subjected to the action of a first die by which it assumes the form of a disc adhering to the inner wall of the base of the cap. After the first die has been extracted, a second portion of compression-mouldable material is inserted into the cap, this material possessing good mechanical hydraulic seal characteristics.

The material of said second portion is conveniently chosen from SBS (styrene-butadiene-styrene) rubber, SEBS (styrene-ethylene-butadiene-styrene) rubber, EVA (ethylene vinylacetate), and LLDPE (linear low density polyethylene), or mixtures of said materials.

In order to further reduce the possibility of oxygen coming into contact with the contents of the container closed by the cap, chemical substances known commonly as scavengers, such as sodium ascorbate or sodium sulphite, can be added to the material of the second portion in order to react chemically with the $O_2$ and prevent oxidation both by the $O_2$ already present in the container, and by that which may enter.

The insertion of a second die creates a disc of the material of said second portion which covers the first disc and is intended to come into contact with the contents of the bottle closed by the cap.

The synergic action of the two materials ensures both the hydraulic seal and the barrier effect.

If any mutually contacting materials are not compatible, an intermediate layer of adhesive can be provided between their layers.

The adhesive layer conveniently consists of PPgMAH (polypropylene grafted with maleic anhydride), or LDPEg-MAH (low-density polyethylene grafted with maleic anhydride).

Three examples of caps constructed by the method of the invention are described hereinafter by way of non-limiting example with the aid of the figures of the accompanying drawings.

The figures from FIG. 1 to FIG. 9 show a first embodiment of the invention in accordance with Example 1.

The figures from FIG. 10 to FIG. 18 show a second embodiment of the invention in accordance with Example 2.

The figures from FIG. 18 to FIG. 27 show a third embodiment of the invention in accordance with Example 3.

In all the examples a cap 1 already formed by compression moulding or by other means is illustrated.

EXAMPLE 1

Figure 1:
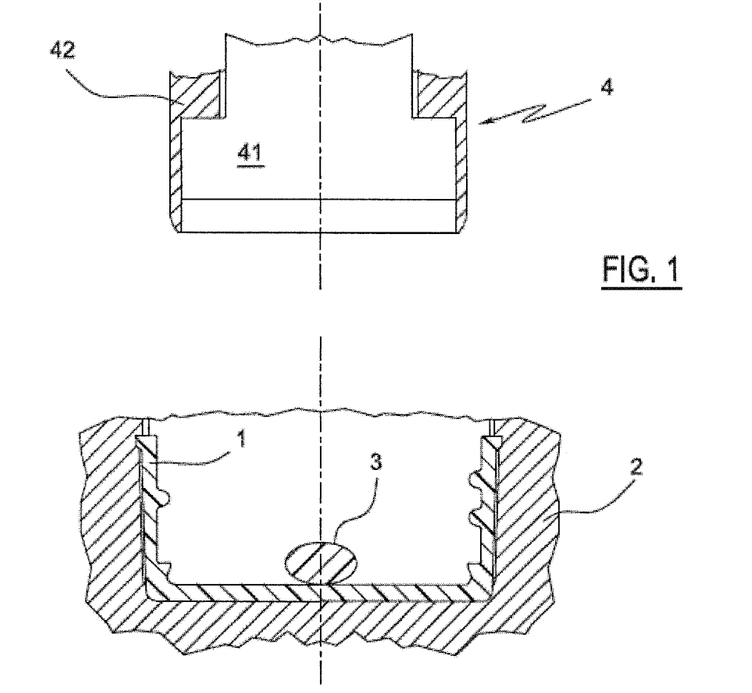

The first portion 3 of molten material has been inserted onto the base of the cap 1 which has been previously formed by a suitable process, and the first forming die 4 is descending.

This comprises a central part 41 and a restraining ring 42 slidable on the outside thereof.

Figure 2:
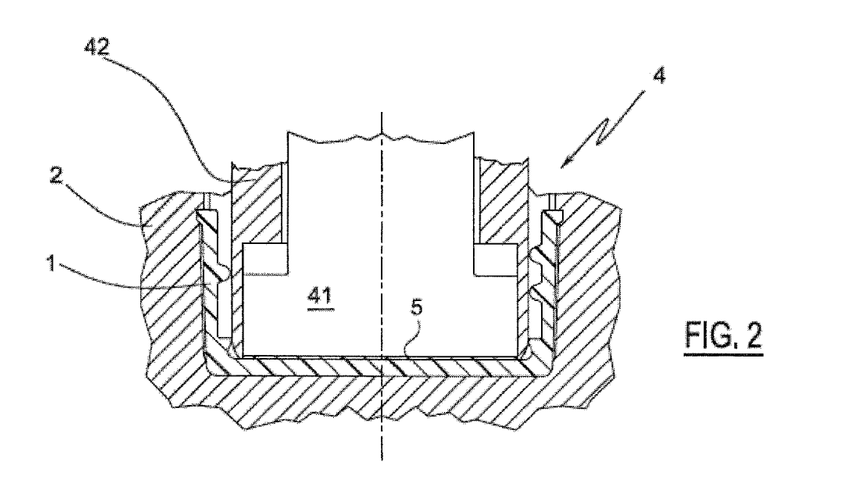
Figure 3:
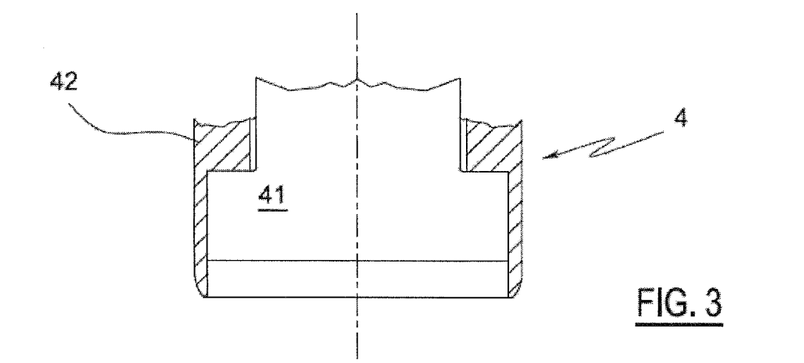
Figure 4:
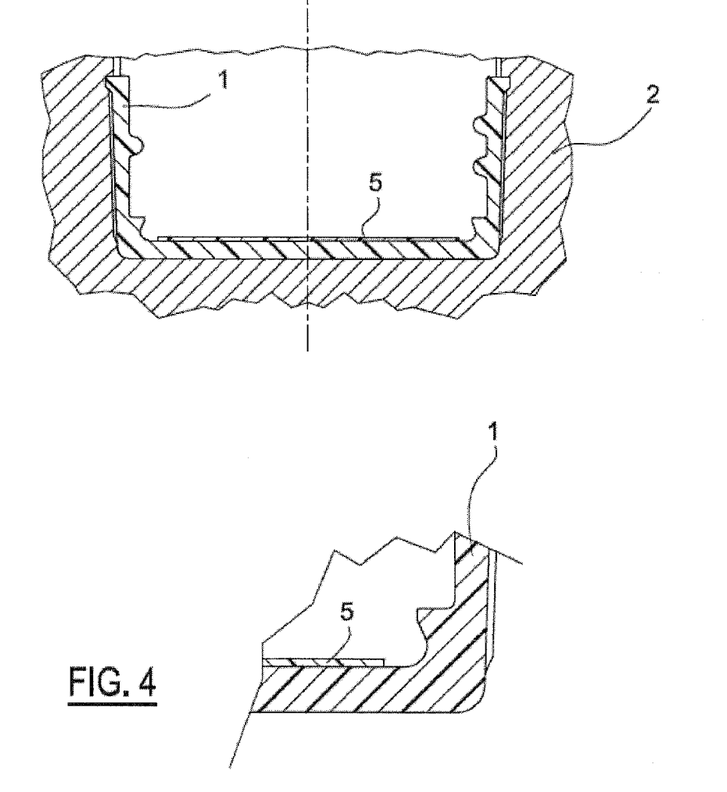

This first die 4 enters the cap and moulds the molten material to create a first layer in the form of a disc 5 which projects in relief from the surface of the base of the cap 1 (FIG. 2 and FIG. 4).

The outer diameter of the disc 5 is determined by the inner diameter of the restraining ring 42 of the first die 4.

When the first die 4 has left the cap 1, the form and position of the first layer 5 of the gasket are as shown in FIG. 4.

Figure 5:
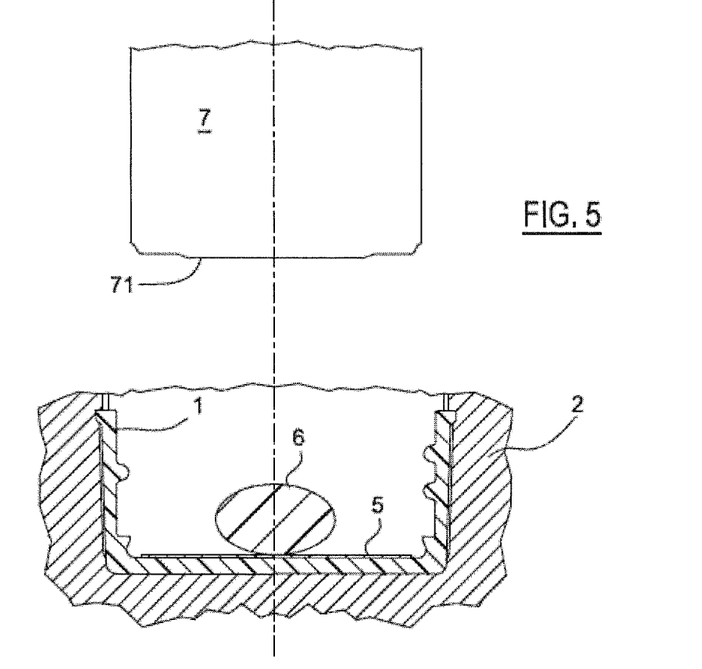
Figure 6:
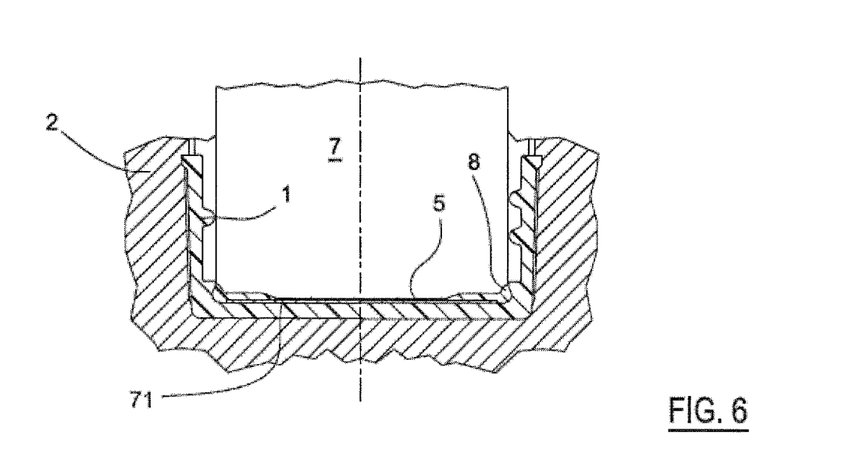
Figure 7:
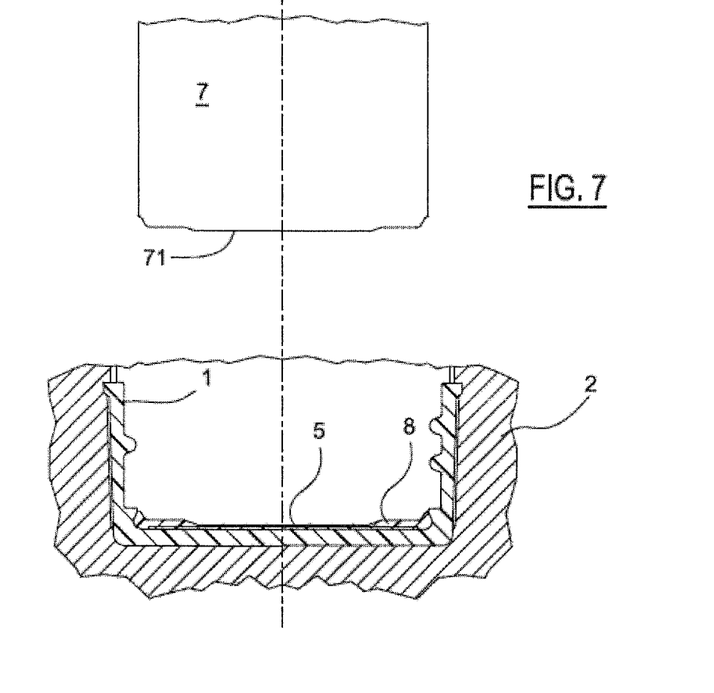
Figure 9:
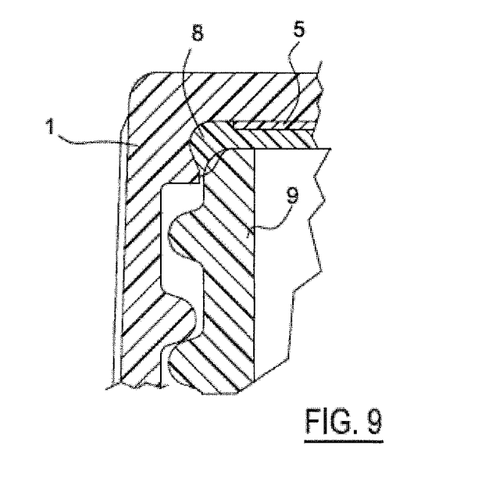

The second portion 6 of molten material is then inserted onto the base of the cap above the first layer 5, and the second forming die 7 is lowered (FIGS. 5 and 6). The second forming die 7 gives the second portion 6 of material a profile determined by the shape of the base 71 of the die 7, this profile being intended to make contact with the mouth of the container (FIG. 9).

Figure 8:
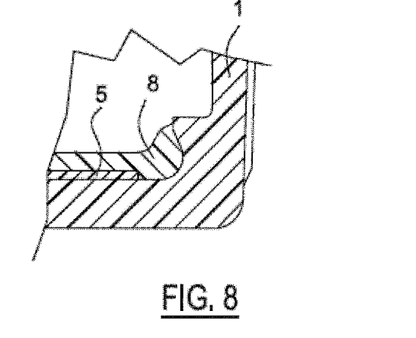

The die 7 then leaves the cap 1, FIG. 8 showing the overall form of the gasket, with a first barrier layer 5 and a second layer 8 which mechanically seals the closure. FIG. 9 shows a section through the cap when applied to the bottle mouth, and highlights the limits of this embodiment, consisting of a necessarily small diameter of the barrier layer 5 due to the fact that it necessarily lies within the restraining ring 42 of the die 4.

In addition, the layer 5 projects from the base of the cap, and inhibits flow of the molten material of the second portion 6, so rendering its distribution within the cap difficult.

EXAMPLE 2

Figure 10:
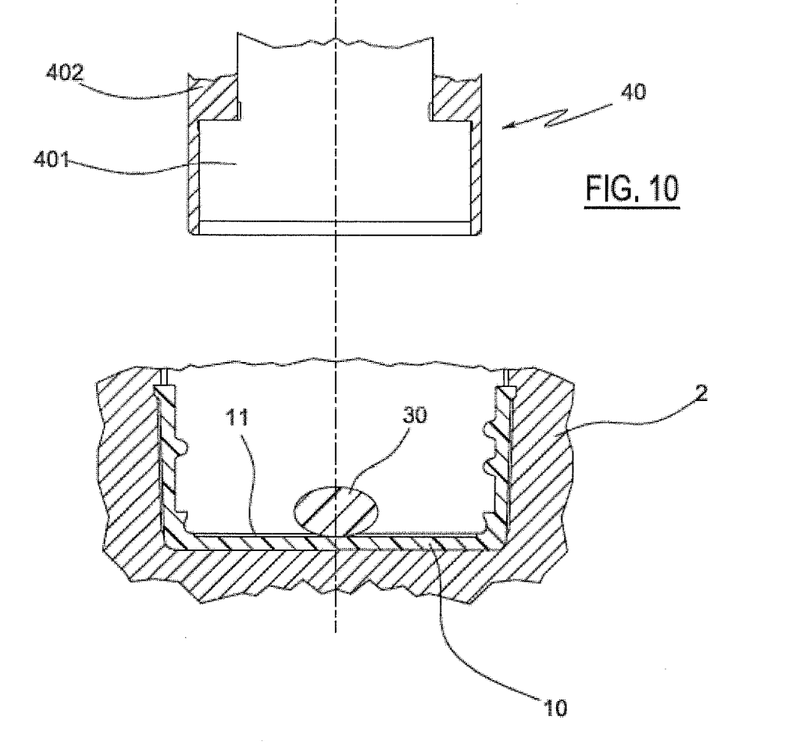

In this embodiment the base of the cap 10 presents a recess or depression 11, the purpose of which will be apparent hereinafter (FIG. 10).

Figure 11:
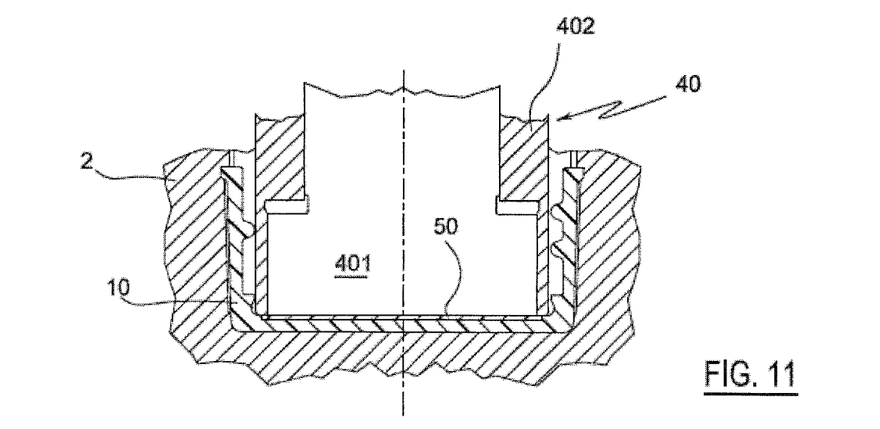

The first portion 30 of molten material is inserted into the recess 11 provided in the base of the cap 10, and the first forming die 40 is lowered (FIG. 11).

This latter comprises a central part 401 and a restraining ring 402 presenting a flat lower edge.

The die moulds the first portion of molten material into a disc 50 which does not project in relief from the surface of the base of the cap 10 as it is completely contained within the recess 11 (FIG. 11).

Figure 12:
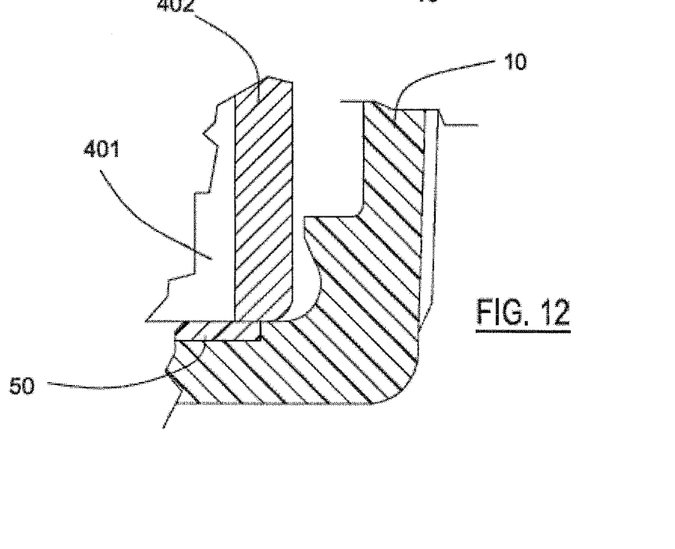

Although the inner diameter of the restraining ring 42 is necessarily less than the diameter of the recess 11, as can be seen in FIG. 12, the diameter of the disc which forms the barrier layer 50 is greater, hence improving the gas seal of the cap. The first forming die 40 leaves the cap 10, with formation of the first layer 50 of the gasket.

Figure 13:
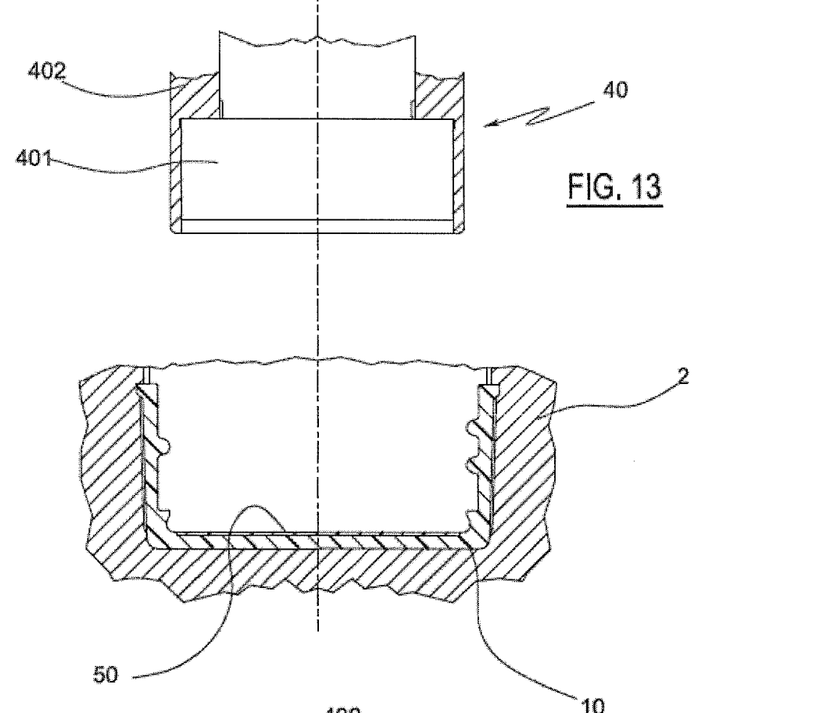

The second portion 60 of molten material is inserted onto the base of the cap 10 above the first layer 50, and the second forming die 70 is lowered.

Figure 14:
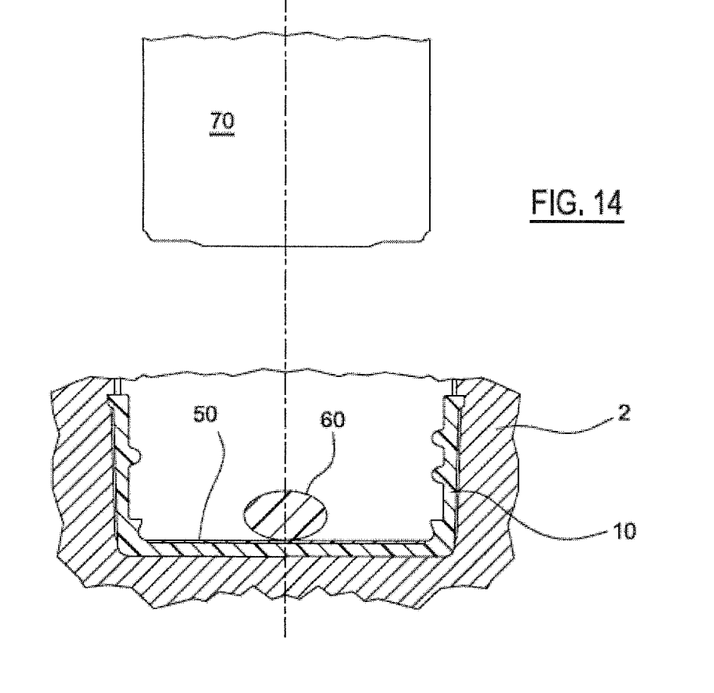
Figure 15:
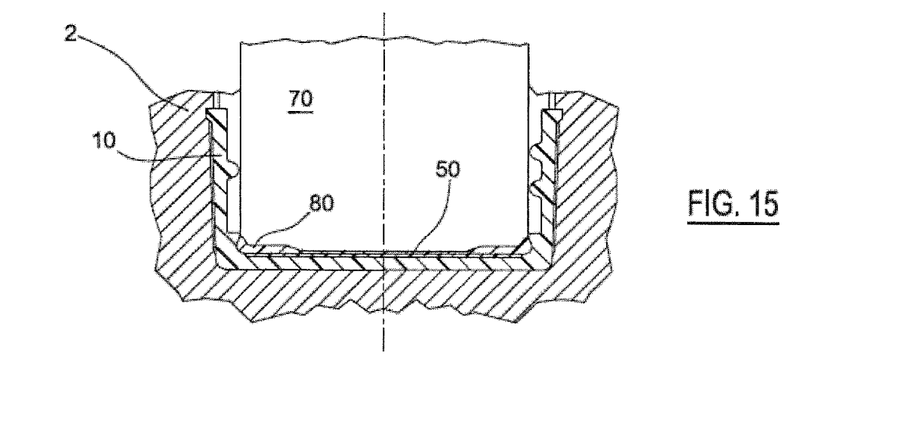

The second forming die 70 gives the second portion of material the required profile, which is determined by the lower shape of the second die 70, and is intended to make contact with the container mouth.

Figure 16:
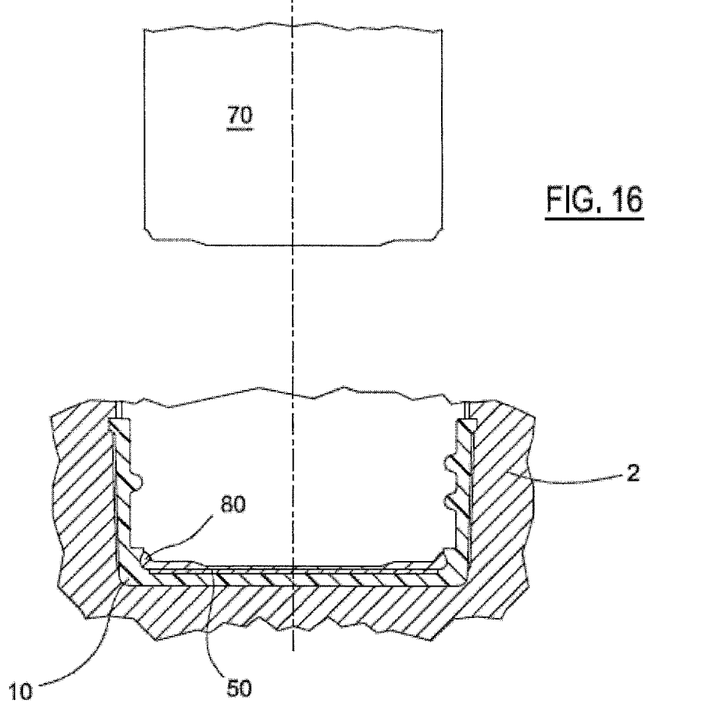
Figure 17:
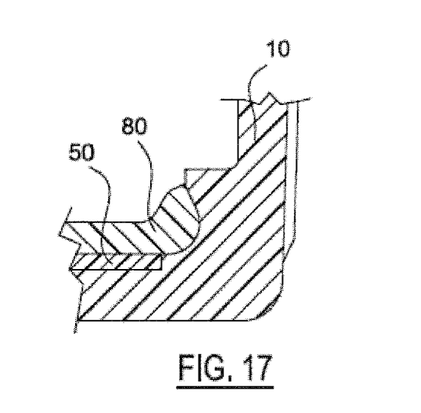

The forming die 70 then leaves the cap (FIG. 16), FIG. 17 showing the overall form of the gasket, with a first barrier layer 50 and a second layer 80 which mechanically seals the container mouth.

Figure 18:
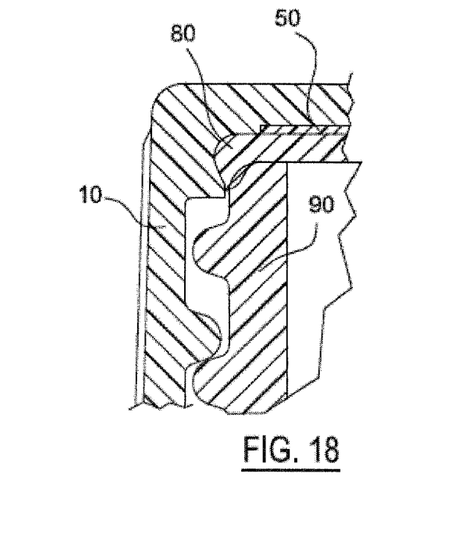

FIG. 18 shows a section through the cap when applied to the container mouth 90. The outer diameter of the barrier layer 50 is greater than that of the layer 5 shown in FIG. 9, and does not project from the base of the cap, so that the flow of the second portion 60 of material during compression is facilitated.

EXAMPLE 3

Figure 19:
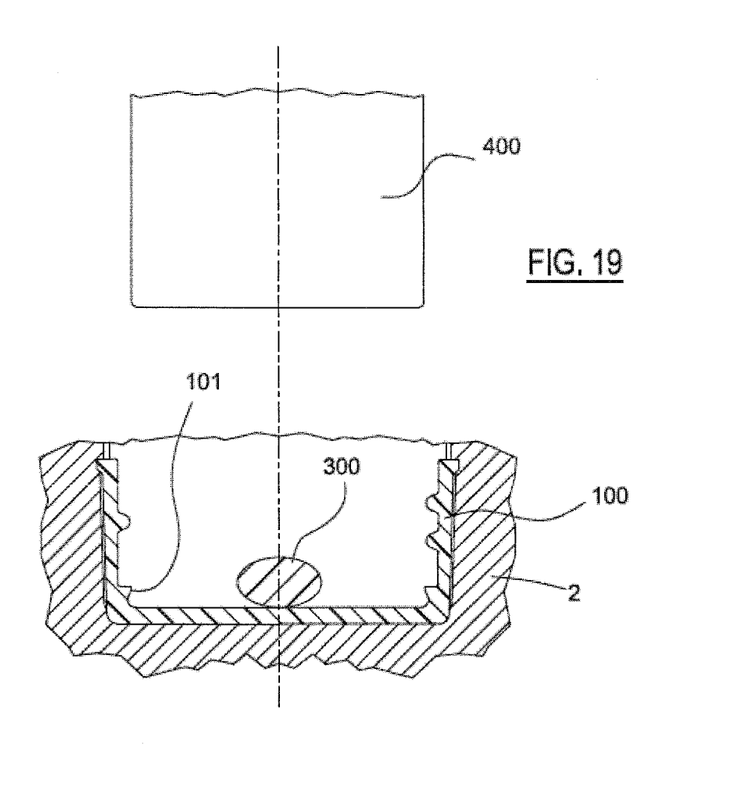

The first portion of molten material 300 is inserted onto the base of the cap 100, and the first forming die 400 is lowered (FIG. 19).

The die moulds the molten material by spreading it to form a layer 500 over the entire base of the cap, and also over the lateral walls of the seat which is to receive the second portion of material.

Figure 20:
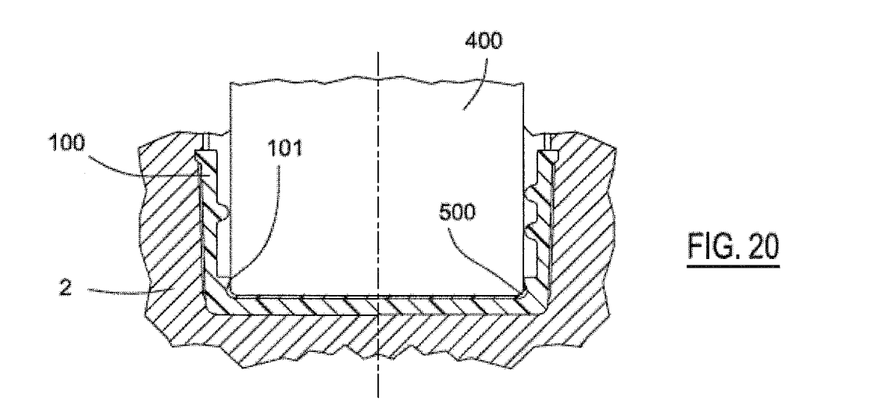

The molten material does not flow to the outside, because the diameter of the die 400 is slightly greater than the diameter of the containing flange 101 of the cap 100 (FIG. 20).

Figure 21:
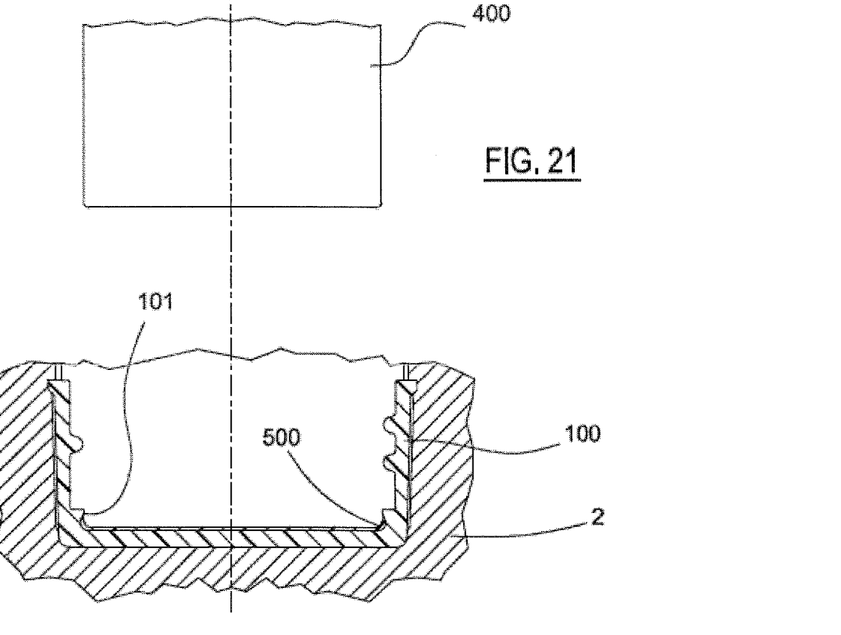
Figure 22:
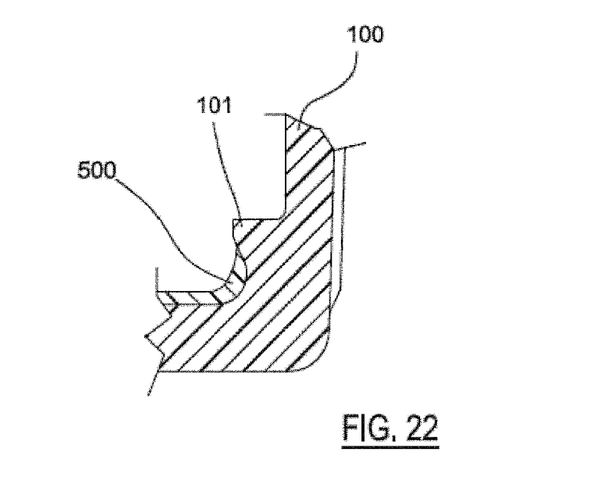

The first forming die 400 then leaves the cap (FIG. 21), FIG. 22 showing the form and position of the first layer 500 of the gasket.

Figure 23:
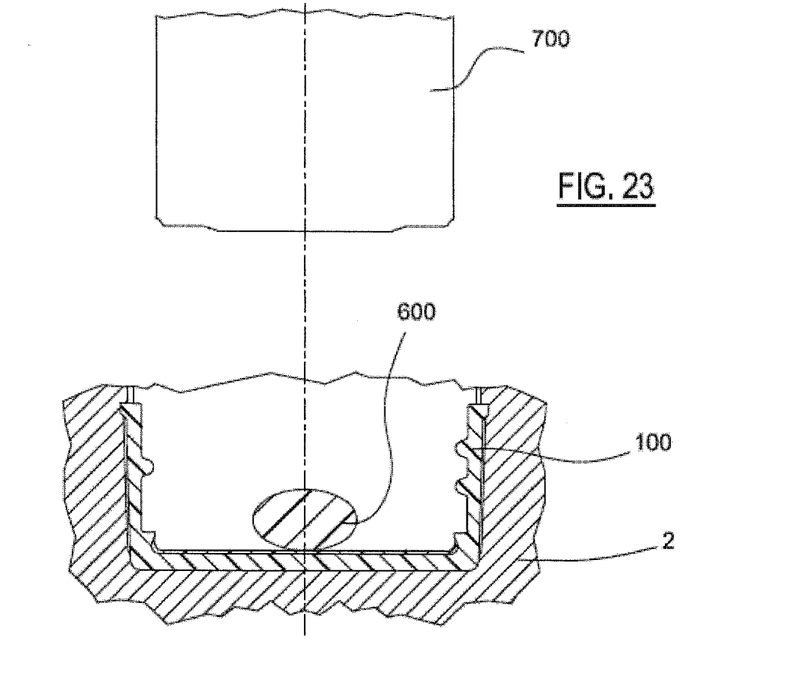
Figure 24:
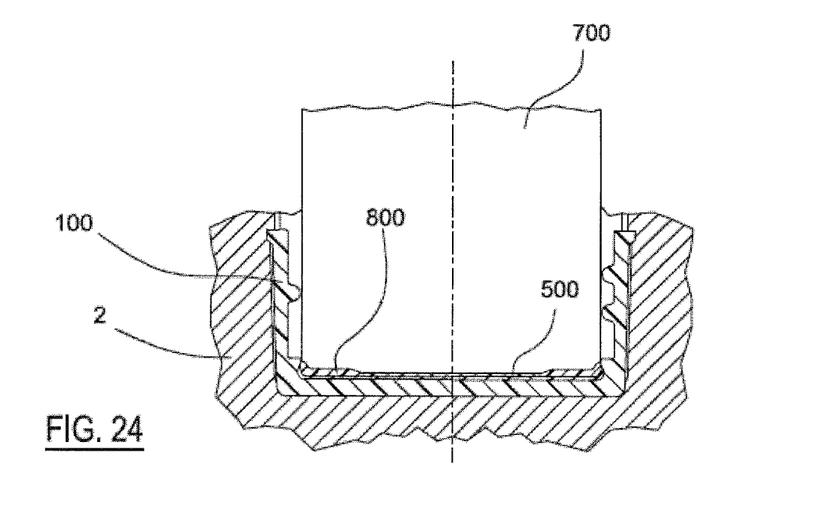

The second portion 600 of molten material is then inserted onto the layer 500 (FIG. 23), and the second forming die 700 is lowered (FIG. 24).

The second forming die gives this second material portion the required profile, in the form of a layer 800, which is to make contact with the container mouth.

Figure 25:
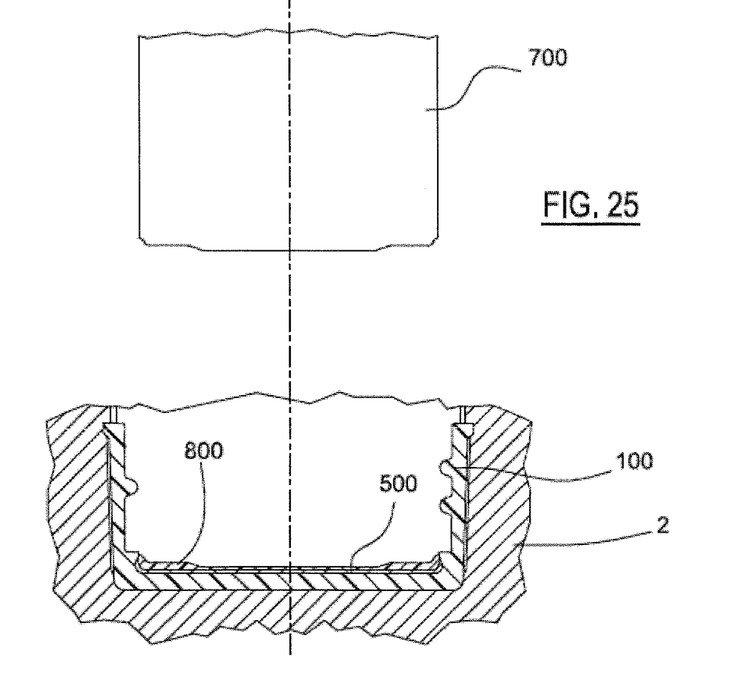
Figure 26:
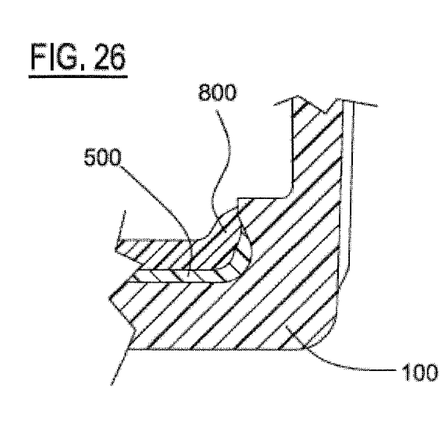

The forming die 700 leaves the cap (FIG. 25), FIG. 26 showing the overall form of the gasket, with a first barrier layer 500 and a second mechanically sealing layer 800.

Figure 27:
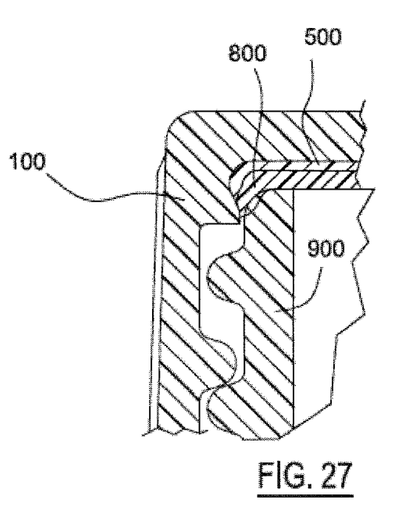

FIG. 27 shows a section through the cap 100 when applied to the bottle mouth 900.

The advantage of this embodiment is that the barrier layer is also present on the lateral walls, so in theory minimizing gas entry by permeation through the walls. This configuration has the drawback that the cross-section of the elastic material of the layer 800 in the sealing region (see FIG. 27) is smaller than that of the embodiments shown in FIG. 9 and FIG. 18, with the result that the mechanical seal could be inferior.

The invention claimed is:

1. A cap for a container for liquid material, the cap provided with an internal seal gasket, wherein the gasket comprises a first layer in contact with an inner surface of the cap, wherein the first layer provides a barrier against gases, and a second layer is in contact with the first layer, wherein the second layer possesses mechanical sealing properties; wherein the second layer prevents the first layer from coming into contact with the liquid material in the container and the second layer presents a raised peripheral region for contacting the top of the container, and wherein the first layer has a circular shape and a diameter smaller than an inner diameter of the inner surface of the cap and wherein the second layer is in direct contact with an entire surface of the first layer and entirely covers the first layer and a portion of the inner surface of the cap that extends past the diameter of the first layer.

2. The cap according to claim 1, wherein the first layer is made of a material admixed with scavengers that react rapidly with oxygen to prevent the contents of the container from being oxidized.

3. The cap according to claim 1, wherein the second layer is made of a material admixed with scavengers that react rapidly with oxygen to prevent the contents of the container from being oxidized.

4. The cap according to claim 1, wherein the first layer is contained in a recess in a base of the cap.

5. The cap according to claim 1, wherein the first layer consists of a material selected from the group consisting of polyvinyl chloride resins of high nitrile content, polyamide, polyvinyl alcohol (EVOH), and polyethylene naphthenate.

6. The cap according to claim 1, wherein the second layer consists of compounds selected from the group consisting of SBS rubber, SEBS rubber, EVA, LLDPE, and mixtures thereof.

7. The cap according to claim 1, wherein an adhesive is present between the base of the cap and the first layer.

8. The cap according to claim 7, wherein the adhesive is selected from the group consisting of polypropylene grafted with maleic anhydride (PPgMAH) and low density polyethylene grafted with maleic anhydride (LDPEgMAH).

9. The cap according to claim 1, wherein an adhesive is present between the first layer and the second layer.

10. The cap according to claim 9, wherein the adhesive is selected form the group consisting of polypropylene grafted with maleic anhydride (PPgMAH) and low density polyethylene grafted with maleic anhydride (LDPEgMAH).

11. A cap provided with an internal seal gasket, wherein the gasket comprises a first layer in contact with the cap, the first layer having barrier properties against gases; and a second layer in contact with the first layer, the second layer having hydraulic sealing properties;

wherein the first layer is contained in a recess provided in a base of the cap and is flush with an edge of the recess, and the second layer is in direct contact with and entirely covers an entire surface of the first layer, and presents a raised peripheral region intended for meeting the top of the container that entirely covers the first layer and extends radially outward of the recess so as to be in direct contact with the cap in a region radially outward of the recess.

12. A cap provided with an internal seal gasket, wherein the gasket comprises a first layer in contact with an inner surface of the cap, wherein the first layer provides a barrier against gases, and a second layer is in contact with the first layer, wherein the second layer possesses mechanical sealing properties; wherein the second layer prevents the first layer from coming into contact with the liquid material in the container and the second layer presents a raised peripheral region for contacting the top of the container, and wherein the cap is formed with a base and a peripheral wall extending from the base, wherein the first layer has a first portion in direct contact with the entire base and a second portion extending at an angle longitudinally within the cap from the first portion to cover a first portion of the peripheral wall, and the second layer is in direct contact with the first and second portions of the first layer and a portion of the peripheral wall extending past the second portion of the first layer without any gaps between the first and second layers, and wherein the first layer is contained in a recess in a base of the cap.

13. The cap according to claim 12, wherein the first layer is made of a material admixed with scavengers that react rapidly with oxygen to prevent the contents of the container from being oxidized.

14. The cap according to claim 12, wherein the second layer is made of a material admixed with scavengers that react rapidly with oxygen to prevent the contents of the container from being oxidized.

15. The cap according to claim 12, wherein the first layer consists of a material selected from the group consisting of polyvinyl chloride resins of high nitrile content, polyamide, polyvinyl alcohol (EVOH), and polyethylene naphthenate.

16. The cap according to claim 12, wherein the second layer consists of compounds selected from the group consisting of SBS rubber, SEBS rubber, EVA, LLDPE, and mixtures thereof.

17. The cap according to claim 12, wherein an adhesive is present between the base of the cap and the first layer.

18. The cap according to claim 17, wherein the adhesive is selected from the group consisting of polypropylene grafted with maleic anhydride (PPgMAH) and low density polyethylene grafted with maleic anhydride (LDPEgMAH).

19. The cap according to claim 12, wherein an adhesive is present between the first layer and the second layer.

20. The cap according to claim 19, wherein the adhesive is selected form the group consisting of polypropylene grafted with maleic anhydride (PPgMAH) and low density polyethylene grafted with maleic anhydride (LDPEgMAH).

* * * * *